Figure 3:
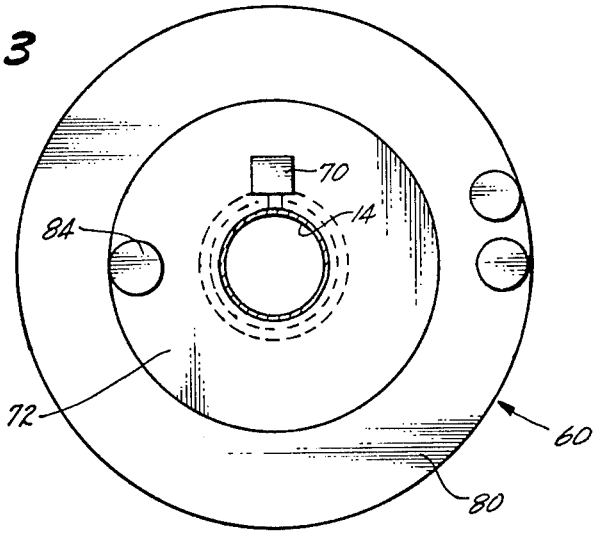
Figure 4:
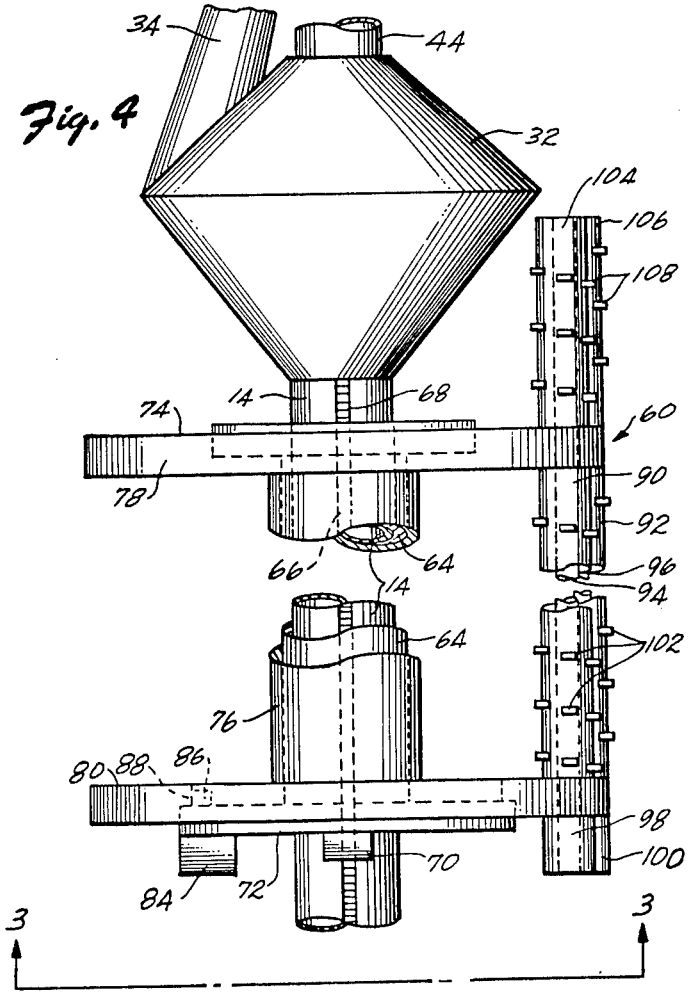

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MARCH 2, 1976

944 O.G. 42

T944,008
SINGLE POINT MOORING SYSTEM FOR USE IN ARCTIC WATERS

Joseph F. Schirtzinger, Pasadena, Calif., assignor to Sea-Log Corporation, Pasadena, Calif.

Filed Dec. 16, 1974, Ser. No. 532,841
Int. Cl. B63b *35/12*
U.S. Cl. 9—8 P
2 Sheets Drawing. 11 Pages Specification

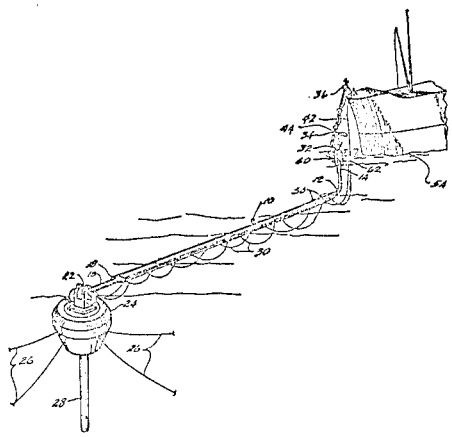

A floating rigid tubular boom is anchored at one end to a submerged tank or buoy. The other end of the boom is adapted to be connected to a tanker for transferring oil from the tanker to a submerged tank or on-shore facility. The submerged end of the boom is anchored below the normal depth of ice occurring in the surrounding waters. An ice-cutting arrangement 60 on the boom keeps the boom free of ice where it passes upwardly above the surface of the water.

SINGLE POINT MOORING SYSTEM FOR USE IN ARCTIC WATERS
Original Filed Dec. 16, 1974
Fig. 1
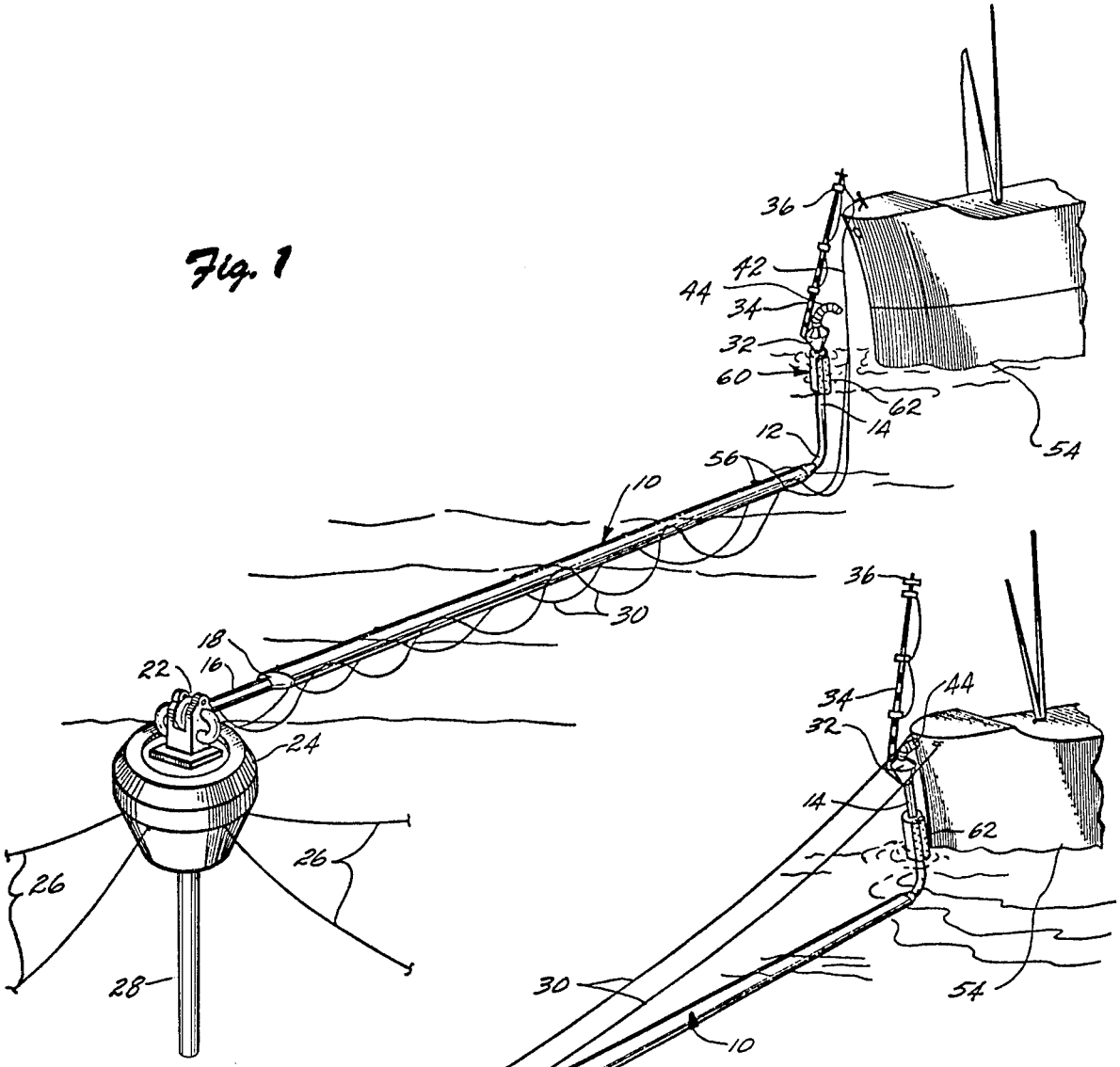
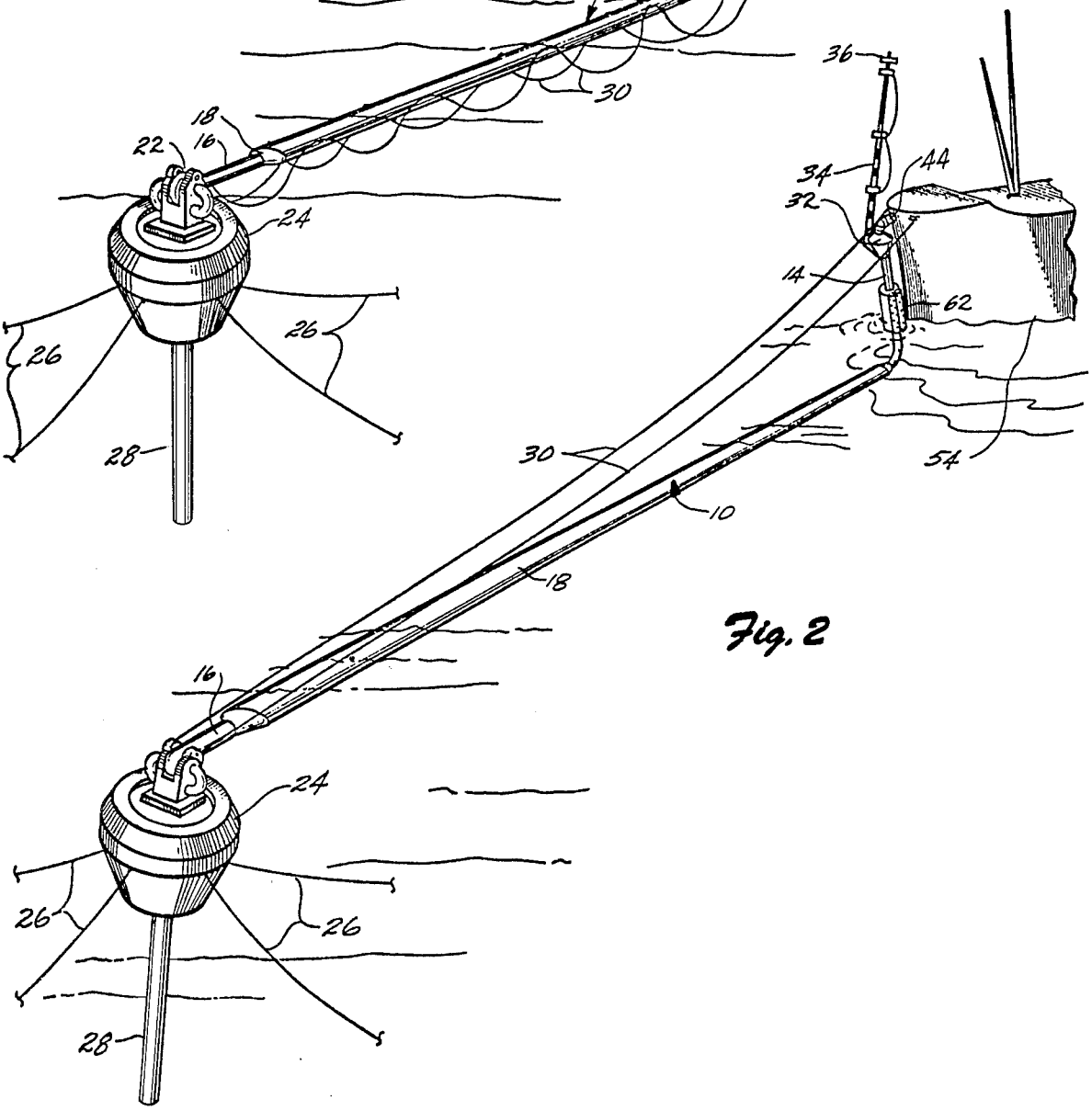
Fig. 2